United States Patent [15] 3,683,261
Holtz et al. [45] Aug. 8, 1972

[54] IGNITION CONTROL DEVICE FOR A CONVERTER

[72] Inventors: Joachim Holtz, Am Walde 29, Braunschweig; Peter Schulze, Maria-Gebbert-str. 14, Uttenreuth, both of Germany

[22] Filed: March 4, 1971

[21] Appl. No.: 121,070

[30] Foreign Application Priority Data

March 4, 1970 Germany..........P 20 10 046.3

[52] U.S. Cl. ..........................321/5, 321/38, 321/40, 321/47
[51] Int. Cl. .............................................H02m 1/08
[58] Field of Search............321/5, 11, 18, 38, 40, 13, 321/42, 47

[56] References Cited

UNITED STATES PATENTS 3,466,525   9/1969   Ainsworth ....................321/38
3,418,557   12/1968   Schaefer.......................321/18
3,551,778   12/1970   Ekstrom ..................321/38 X

OTHER PUBLICATIONS

IEEE Transactions on Power Apparatus and Systems, Ekstrom & Liss, " A Refined HVDC Control System," Vol. PAS- 89, No. 5/6, pp. 723- 732, May/June 1970.

*Primary Examiner*—William H. Beha, Jr.
*Attorney*—Curt M. Avery, Arthur E. Wilfond, Herbert L. Lerner and Daniel J. Tick

[57] ABSTRACT

The invention relates to an ignition control device for a converter having a free swinging oscillating oscillator, whose output voltage permits the regulation of the converter valves at variable ignition angles and in a predetermined sequence. The phase of the oscillator output voltage is controlled in dependence upon a controlled quantity or measurand of the converter such as, for example, the load current. The ignition control device can be used in a "soft power supply system" and is characterized by a good ignition angle symmetry.

13 Claims, 6 Drawing Figures

IGNITION CONTROL DEVICE FOR A CONVERTER

DESCRIPTION OF THE INVENTION

The invention relates to an ignition control device. More particularly, the invention relates to an ignition control device for a converter having a free oscillating oscillator, the output voltage of which oscillator regulates or adjusts the converter valves at variable ignition angles and in a predetermined sequence.

Ignition control devices for converters are known, for example, from an article by J. D. Ainsworth, entitled "The Phase-Locked Oscillator—A New Control System for Controlled Static Converters", IEEE Transactions on Power Apparatus and Systems Vol. Pas 87,1968, p. 854 to 865. In the article, each converter valve is provided with a signal which is derived from the power supply or mains voltage and indicates the time period of the natural commutation, that is, the time of current transfer, when diodes are used. These signals assist in deriving the delayed ignition time for each valve. This method is reliable as long as the power supply or mains voltage is devoid of harmonics. In power supplies or mains with high internal resistance, the power supply or mains voltage is deformed and thus contains more harmonics. The signals obtained from the mains voltage are shifted. Since these signals determine the time period of the natural commutation, the ignition pulses are not correctly correlated with respect to time, and instabilities may occur. Such a power supply system is known as a "soft power supply system".

The aforedescribed publication discloses an ignition control device of the aforedescribed type. This ignition control device may be used in a soft power supply system. It has an integral effect, however, and may be operated only in a closed control circuit.

An object of the invention is to provide an ignition control device which can be operated in a soft power supply system without producing undesirable side effects.

Another object of the invention is to provide an ignition control device which limits ignition errors to less than ± 0.25° and in which the ignition angle symmetry is better than that in ignition control devices of known type.

To accomplish this, and in accordance with the invention, the problem is solved by the utilization of an ignition control device of the aforedescribed type due to the fact that the phase of the oscillator voltage may be regulated in dependence upon the controlled quantity of the converter. The controlled quantity may be represented by the load current of the converter. Since the ignition control device has a free oscillating oscillator, it does not depend on a synchronization through the power supply voltage, and may be operated in a soft power supply system. Because the phase of the oscillator voltage is shifted, the ignition control device operates proportionally and may be utilized in an open control circuit.

It is preferable to compare the output voltage of a regulator, which depends upon the controlled quantity of the converter, with a reference voltage which increases or rises in proportion to time. The comparison result is utilized to reset the reference voltage by a constant magnitude by utilizing a threshold of the comparison voltage, and to release an ignition pulse for one of the converter valves with the assistance of the reset pulse for the reference voltage. The reference voltage may be provided from a constant direct voltage by an integrator. The reference voltage may be reset by the pulse of a monostable multivibrator which is released by the threshold of the comparison voltage. The pulse of the monostable multivibrator may be used to step up a ring counter.

The phase of the oscillator is preferably controllable within the range of two thresholds, according to an ignition angle $\alpha_0 = 0$ and $0 < \alpha_1 < 180°$. Both thresholds may be derived from the alternating voltage of the converter. By limiting the phase shifting, great disturbances in the controlled path, circuit or system may be prevented from leading to instabilities in the converter. Each phase of the alternating voltage of the converter may provide two pulses which are shifted in opposition by 180°, relative to the AC period. The thresholds may be derived by logical connections or circuits from these pulses and from the ignition pulses of the converter valves.

The threshold corresponding to the ignition angle $\alpha_0$ may block the monostable multivibrator provided for resetting the reference voltage independently of the sum of the comparison voltage. The monostable multivibrator may be regulated by the other threshold. Each of the pulses derived from the alternating voltage of the converter, and one output, respectively, of the ring counter may be supplied to an AND gate. The outputs of the AND gates may be supplied to an OR gate. The output of the OR gate may be supplied to one input of an AND gate and the comparison voltage may be supplied to the second input of said AND gate, whose output signal regulates or adjusts the monostable multivibrator provided for the reference voltage.

Furthermore, each of the pulses obtained from the alternating voltage of the converter and one output, respectively, of the ring counter may be supplied to an AND gate, respectively, and the outputs of the AND gate may be supplied to an OR gate. The output of the OR gate may be supplied to one input, and the threshold of the comparison voltage to the second input, of a second OR gate, whose output signal regulates the monostable multivibrator provided for resetting the reference voltage.

The disturbance or interfering factors or variables which effect the converter are regulated or controlled by the ignition control device. Disturbance or interfering factors or variables which effect non-ideal components such as, for example, an oscillator, may, however, lead to difficulties. Such a disturbance or interfering factors or variables may be controlled only for a limited period of time. Preferably, in order to remove these disadvantages, besides the phase of the oscillator, the frequency also should be controllable in dependence upon the controlled quantity of the converter. The output voltage of the regulator, which depends upon the controlled quantity of the converter, may be comparable with a reference voltage which increases or rises according to time and is derivable from a constant direct voltage by an integrator with a curved characteristic.

The reference voltage may be reset by a constant sum by a threshold of the comparison voltage, and the pulse of the reference voltage may be used to release an ignition pulse for one of the converter valves. The negligible frequency change which is provided due to the curved characteristic of the integrator causes the regulator output voltage to always remain within a median or average voltage range, in stationary position or condition, and to slowly revert back to the starting value after a dynamic control process. The aforementioned disturbance or interfering factors or variables are also controlled simultaneously thereby.

In order that the invention may be readily carried into effect, it will now be described with reference to the accompanying drawings, wherein.

Figure 1:
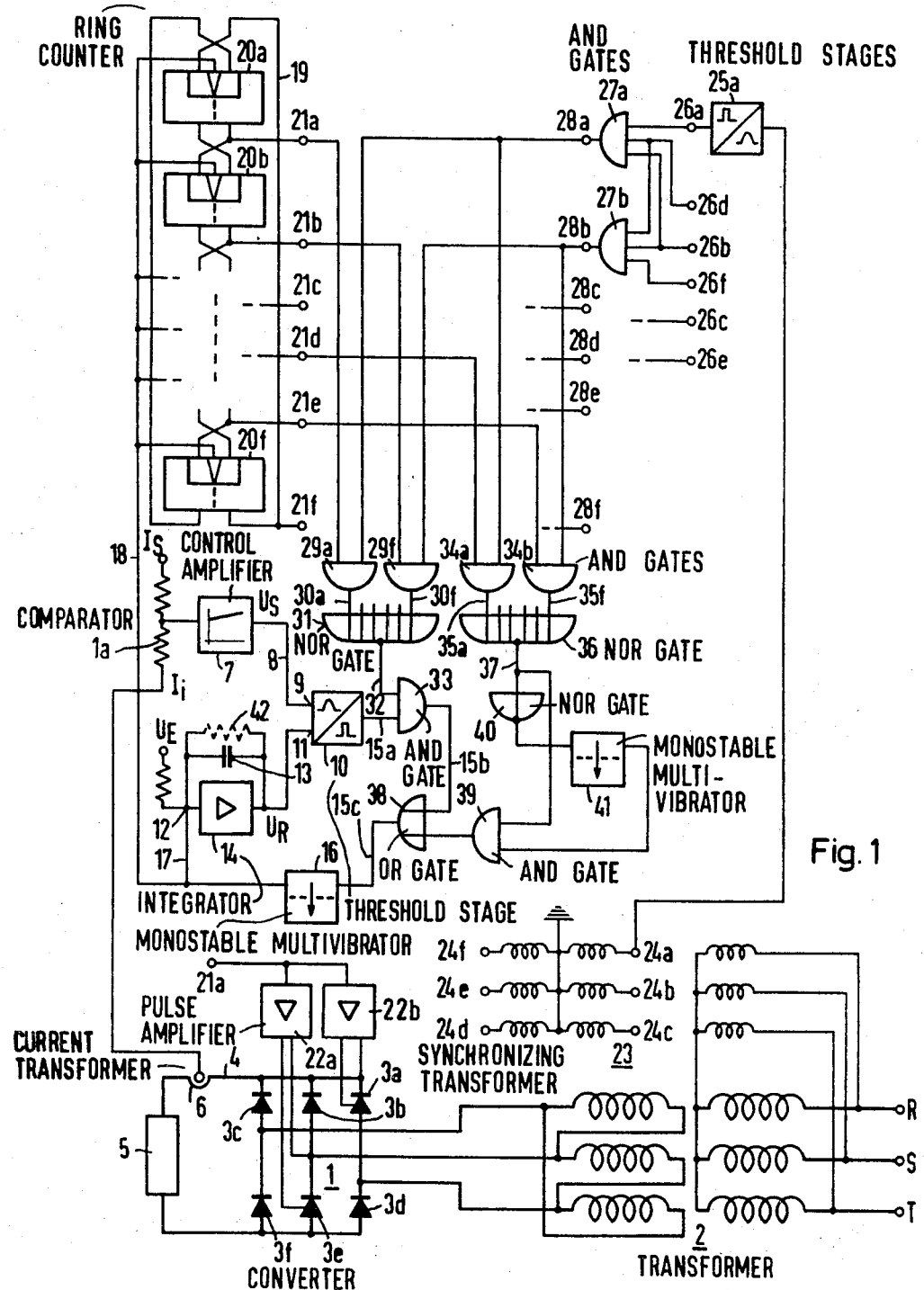
FIG. 1 is a block diagram of an embodiment of the converter of the invention.

FIG. 1 shows an embodiment of the converter of the invention. A converter or rectifier 1 is energized by a three-phase power source having phases R,S and T, via a three-phase transformer 2. The converter or rectifier comprises a plurality of valves 3a to 3f, which may constitute thyristors and which are combined in a three-phase bridge circuit. The converter has a load circuit 4 which includes a load 5. The pilot or actual value of the current $I_i$ is derived via a current transformer 6 in the load circuit 4.

The pilot or actual current value $I_i$ is compared with the assumed, reference or datum current value $I_s$ in a comparator 7a. The control deviation, or deviation from the desired value is supplied to a control amplifier 7 having an output 8 at which a regulating or control voltage $U_S$ is derived. The regulating or control voltage $U_S$ is supplied to an input 9 of a threshold stage 10. The threshold stage 10 has a second input 11 connected to a source of reference voltage $U_R$. The reference voltage $U_R$ increases or rises essentially in proportion to the time.

The reference voltage $U_R$ increases linearly with the time and is derived from a constant DC input voltage $U_E$ applied to an input 12 of a DC amplifier 14, which is connected to a capacitor 13 and functions as an integrator. The reference voltage $U_R$ increases until the difference between the control voltage $U_S$ and said reference voltage reaches a threshold determined by threshold stage 10. When the comparison voltage reaches the threshold level the threshold stage 10 produces a pulse which regulates a monostable multivibrator 16 via leads 15a, 15b and 15c.

The voltage-time characteristic or configuration of the pulse of the monostable multivibrator 16 is selected so that the reference voltage $U_R$ at the output of the integrator 14 is reset by a constant sum, via a lead 17, independently of its respective value. The reference voltage $U_R$ also oscillates in the shape of a sawtooth. The oscillating frequency is six times the frequency of the three-phase power source, so that at a power supply frequency of 50 Hz, the frequency of the sawtooth voltage will amount to 300 Hz.

At the same time, a six stage ring counter 19, which comprises six combined flip flops 20a to 20f, is stepped up or counts one step, via a lead 18, simultaneously with the pulse of the monostable multivibrator 16. The ring counter 19 distributes the ignition pulses in the proper sequence, one after another, to all the converter valves 3a to 3f via outputs 21a to 21f of the ring counter 19 and pulse amplifiers 22a and 22b.

If a disturbance variable or interfering factor or such as, for example, a fluctuation in the power supply system or mains, occurs in the converter 1, the difference between the actual current value $I_i$ and the datum current value $I_S$ produces, in the described current regulator, a change in the control voltage $U_S$ at the output of the control amplifier or regulator 7. Since the threshold adjusted by the threshold stage 10, of the comparison voltage between the control voltage $U_S$ and the reference voltage $R_R$, is constant such as, for example, zero the pulse for regulating the monostable multivibrator 16 to a lower or higher reference voltage $U_R$, is delivered by the threshold stage 10. The phase of the sawtooth voltage formed by the reference voltage $U_R$ is changed therefore, but the frequency of this oscillation remains unchanged.

The phase of the ignition pulse, and thus the ignition angle $\alpha$ of the subordinated converter valves 3, is shifted with the phase of the reference voltage $U_R$. This shifting of the ignition angle $\alpha$ last until the disturbance or interfering factor or variable is corrected. Thereafter, the control voltage $U_S$, and thus the phase of the oscillation of the oscillator, returns to its initial value. FIGS. 3a, 3b and 4a, 4b assist in explaining this control operation.

In each of FIGS. 3a, 3b, 4a and 4b, the absissa represents the time t and the ordinate represents the control voltage $U_S$ and the sawtooth reference voltage $U_R$. In FIGS. 3a, 3b, 4a and 4b, the threshold of the comparison voltage is zero. At greater disturbances or interfering factors, a phase shifting of the reference voltage $U_R$, and hence an ignition angle $\alpha$, is obtainable when the control of the converter 1 and the applied alternating voltage are no longer synchronous. The shifting of the ignition angle $\alpha$ must therefore be limited by a lower and upper limit. The ignition angle should not fall below $\alpha_0 = 0°$, relative to the alternating voltage, nor exceed an adjustable upper ignition angle, which must be smaller than 180°, for example, $\alpha_1 = 150°$.

Since the reference voltage $U_R$ is free oscillating, the time marks or markings for the limit must be derived from the applied alternating voltage. Actually, this creates the difficulty which must be avoided by the selection of the described control system, but these marks are used only when the indicated critical angles are obtained. No synchronization is effected between the marks. In this range, the regulating circuit always shifts the ignition angle $\alpha$, so that the actual current value $I_i$ is equal to the datum current value $I_s$.

The critical angles $\alpha_0$ and $\alpha_1$ are provided with the assistance of logical circuits or connections, from pulses which are synchronized by the alternating voltage of the converter 1. The phases R,S and T of the three-phase power supply source are connected to the primary windings of a synchronizing transformer 23. The synchronizing transformer 23 has secondary windings having terminals 24a to 24f. The terminals 24a to 24f are connected to the inputs of threshold stages 25a to 25f. To preserve the clarity of the drawing, only threshold stage 25a is shown in FIG. 1. The connections of the terminals 24a to 24f of the secondary windings of the synchronizing transformer 23 to the threshold stages 25a to 25f may be derived from the reference numerals of outputs 26a to 26f of the corresponding ones of the threshold stages 25a to 25f, as indicated in FIG. 1.

The threshold stages 25a to 25f produce square wave pulses, each having a duration of 180°, at the outputs 26a to 26f. This produces two pulse sequences for each phase of alternating voltage. The two pulse sequences are shifted in phase opposition by 180°. Three respective ones of these pulse sequences are supplied, via appropriate outputs 26a to 26f, to the three inputs of one of six AND gates 27a to 27f, of which the AND gates 27a and 27b are shown in FIG. 1. FIG. 1 illustrates the circuit after the outputs 26a to 26f have been connected to the AND gates 27a to 27f.

Figure 2:
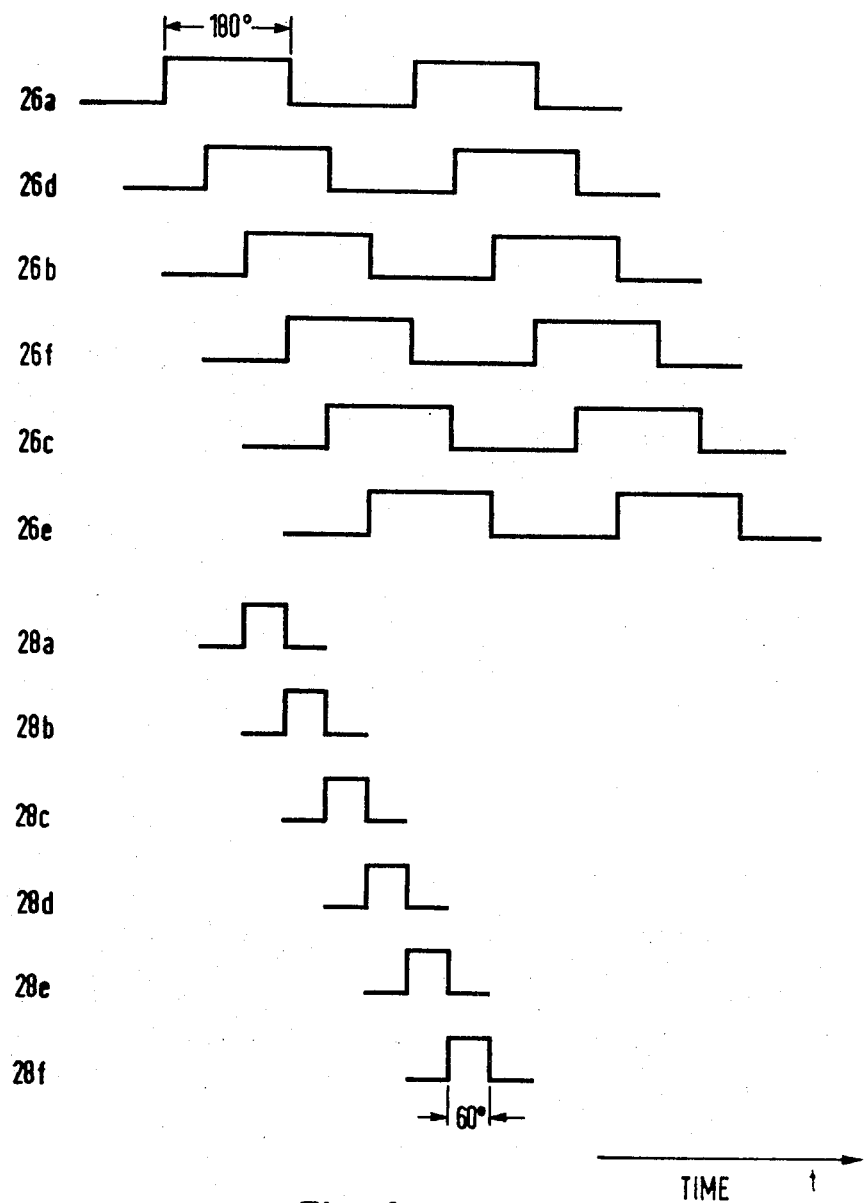
FIG. 2 is a graphical presentation of the pulses at the outputs 26a to 26f and 28a to 28f of FIG. 1.

Pulses are provided at corresponding outputs 28a to 28f of the AND gates 27a to 27f. Each of the pulses has a duration of 60°. The pulses are shifted in opposition by 60°. The pulses of 180° duration at the outputs 26a to 26f and the pulses of 60° duration at the outputs 28a to 28f are shown in FIG. 2. FIG. 2 shows the correlation of the pulse sequences utilized to provide the pulses of 60° duration.

The square wave pulses of 60° duration are used to determine, with the assistance of logical circuits or connections, the ignition time $\alpha_0$ and $\alpha_1$, for each converter valve 3. The sequence of the square wave pulses of 60° duration, respectively, may be imagined as an electric power supply system which rotates at six times the line frequency in synchronism with the electric power supply system. The ignition pulses occurring at the outputs 21a to 21f of the ring counter 19 may be thought of as a second electric power supply system which can shift relative to the first power supply system by a specific angle. A logic circuit which is situated between the two power supply systems and is hereinafter described, measures the angle about which both electric power supplies or mains are shifted and prevents the critical angles $\alpha_0$ and $\alpha_1$ from being exceeded.

The corresponding outputs 28a to 28f of the AND gates 27a to 27f are supplied to one of the two inputs of each of AND gates 29a to 29f and the corresponding outputs 21a to 21f of the ring counter 19 are supplied to the other of the two inputs of each of said AND gates. Thus, for example, the outputs 28a and 21a are supplied to the AND gate 29a. The AND gates 29a to 29f have outputs 30a to 30f, respectively, which are connected to a NOR gate 31 having an output 32. The output 32 of the NOR gate 31 and the output 15 of the threshold stage 10 for the comparison voltage, are supplied corresponding inputs of an AND gate 33. The monostable multivibrator 16 is thus regulated by the pulse of the threshold stage 10 released by the threshold of the comparison voltage only when the critical angle $\alpha_0$ is kept within or not fallen short of and a pulse of the NOR gate 31 is supplied to the AND gate 33. The reference voltage $U_R$ may therefore continue to increase or rise, even after the threshold of the comparison voltage is reached, as long as the critical angle $\alpha_1$ is still fallen short of or not reached.

The upper critical angle $\alpha_1$ is obtained by also supplying the outputs 28a to 28f of the AND gates 27a to 27f and the outputs 21a to 21f of the ring counter 19 to AND gates 34a to 34f. In this event, both inputs of an AND gate 34a to 34f are supplied with the outputs 28a to 28f and 21a to 21f whose pulses are shifted in opposition by 180°. These are, for example, the outputs 28a and 21d, which are connected and supplied to the AND gate 34a, and the outputs 28b and 21e, which are connected and supplied to the AND gate 34b. The AND gates 34a to 34f have outputs 35a to 35f, respectively, which are connected and supplied to a NOR gate 36. The NOR gate 36 has an output 37. The output 37 and the output 15 of the threshold stage 10 are connected and supplied to an OR gate 38. The monostable multivibrator 16 is regulated by the output pulse of the OR gate 38. The reset pulse for the reference voltage $U_R$ is therefore released when the critical angle $\alpha_1$ is exceeded, independently of reaching the threshold for the comparison voltage between the control voltage $U_S$ and the reference voltage $U_R$. The described selection of outputs 21 and 28 which are connected to the AND gates 34, would produce a fixed ignition angle $\alpha_1$ — 120°. The ignition angle $\alpha_1$ may be increased in duration by delaying the pulse supplied to the AND gate 38. To accomplish this, the output 37 of the NOR gate 36 must be directly supplied to an input of an AND gate 39.

The output 37 of the NOR gate 36 is directly connected to one input of the AND gate 39 and is connected to the other input via a NOR gate 40 and a monostable multivibrator 41 having an adjustable pulse duration. The output of the NOR gate 40 regulates the monostable multivibrator 41. Thus, depending upon the pulse duration of the pulses of the monostable multivibrator 41, a delayed signal is provided at the output of the AND gate 39 and is delivered to the input of the OR gate 38. Thus, any desired or arbitrary firing or ignition angles $\alpha_1$ may be adjusted between 120° and 180° by changing the pulse duration of he monostable multivibrator 41.

As hereinbefore mentioned, disturbance or interfering factors or variables which may occur in the converter 1, for example, as a result of fluctuations in the load or in the power supply or mains voltage, may be adjusted, controlled, regulated or corrected by the control circuit. Disturbance or interfering factors or variables which occur in an oscillator, for example, present another problem. These disturbance variables include a drift in the DC voltage amplifier or integrator 14, fluctuations of the voltage $U_E$, a varying voltage-time characteristic of the monostable multivibrator 16 or frequency changes in the power supply voltage.

It may be imagined that the disturbance variables interfere at the summing point of the DC voltage amplifier or integrator 14. Such disturbance variables may be regulated by the current control circuit over a limited period only, since the integral of the disturbance variable affects the input 11 of the threshold stage. If a sudden disturbance variable were to occur at the summing point of the integrator or amplifier 14, a ramp voltage would appear at the input 11, for example.

Figure 3A:
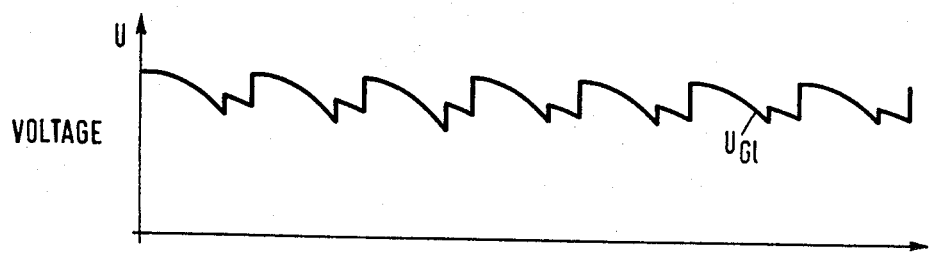
FIG. 3a is a graphical presentation of the DC voltage $U_{G1}$ of the converter during the regulation operation.
Figure 3B:
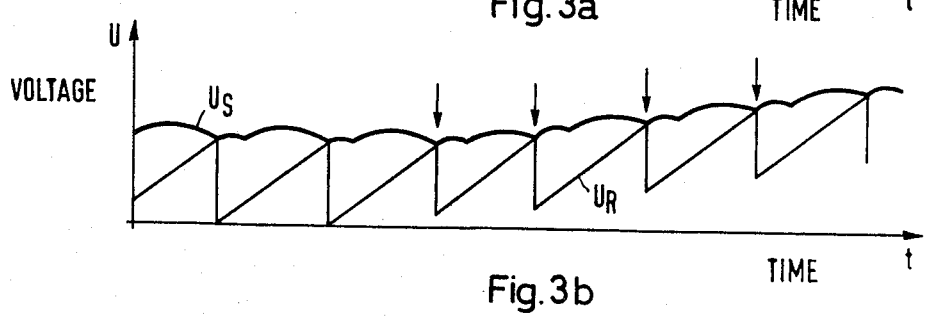
FIG. 3b is a graphical presentation of the control voltage $U_S$ and the reference voltage $U_R$ of the converter during the regulation operation.

In FIG. 3a and 3b, the control voltage $U_S$, the oscillator reference voltage $U_R$ and the direct voltage $U_{G1}$ of the converter 1 are shown relative to time t. The disturbance variables affect the localities indicated by arrows. FIGS. 3a and 3b show the voltage curves during the regulation of the disturbance variables. The regulating or control output voltage $U_S$ drifts. The current can be kept constant only until and as long as the regulator is at its voltage limit. The regulator circuit can then no longer be operated.

To avoid this shortcoming, care must be taken that the regulator output voltage $U_S$ remains, in stationary condition, always in the median or average voltage range of the regulator. Following the regulation of the dynamic process, the regulator output voltage $U_S$ should slowly return to its initial value.

This characteristic may be obtained with the free swinging oscillator by slightly curving the characteristic of the integrator 14, which was previously assumed to be linear. As a result, the reference voltage $U_R$ no longer increases or rises linearly with the time, but is also curved. Such a curve of the characteristic of the integrator 14 may be obtained, for example, with a sum capacitor 13, encumbered with losses. In the integrator 14, such a loss-encumbered capacitor is characterized by a resistor 42 which is shown in broken lines and connected in parallel with the capacitor 13.

The frequency of the sawtooth reference voltage $U_R$ depends on the working point, due to the curved characteristic of the integrator 14. If, for example, a lower datum current value $I_s$ is provided, the ignition angle increases and the frequency is simultaneously reduced. A reduction in the frequency affects a further increase in the ignition angle and thus a reduction in current. The current regulator reduces its output voltage in order to adjust the current to the new datum value. Simultaneously, the frequency increases slowly, until the reference voltage $U_R$ again oscillates at its provided value, for example, 300 Hz, and the output voltage of the regulator $U_S$ again reaches its initial output value.

Figure 4A:
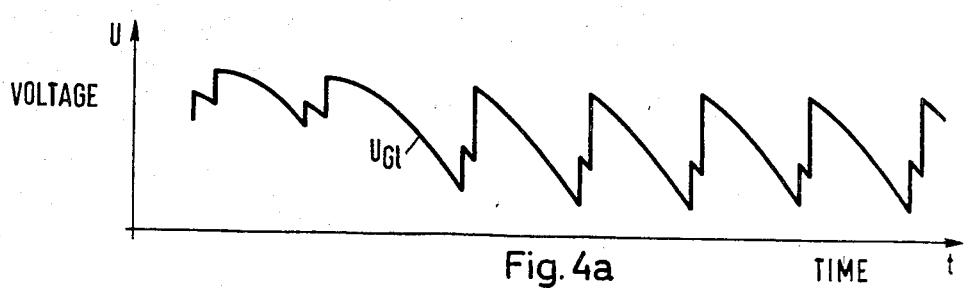
FIG. 4a is a graphical presentation of the DC voltage $U_{G1}$ of the converter during the regulation operation for a lower datum current.
Figure 4B:
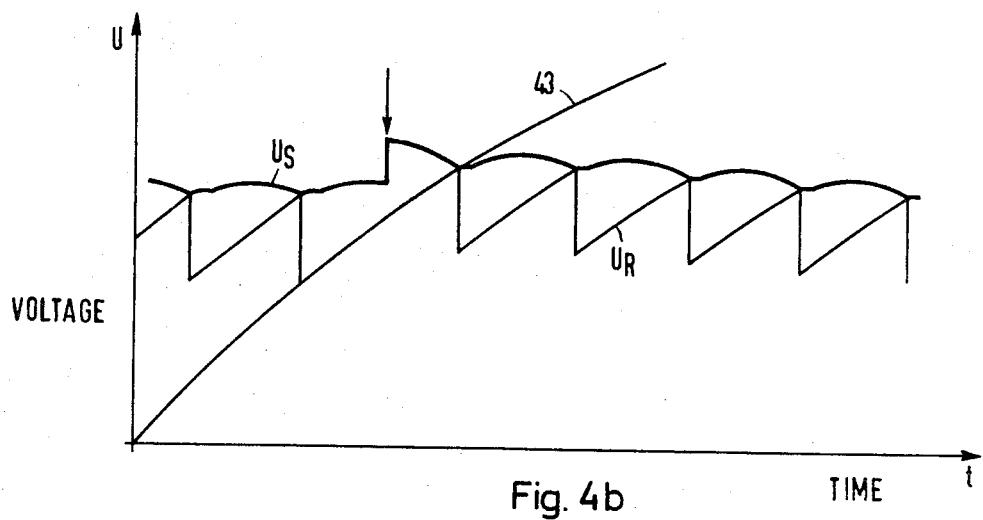
FIG. 4b is a graphical presentation of the control voltage $U_S$ and the reference voltage $U_R$ of the converter during the regulation operation for a lower datum current.

The aforedescribed regulating process is shown in FIGS. 4a and 4b, wherein the control voltage $U_S$, the oscillator reference voltage $U_R$ and the direct voltage $U_{G1}$ of the converter 1, are shown relative to time $t$. A jump of the datum current value $I_s$ is assumed at the location indicated by the arrow in FIG. 4b. The curve 43 of FIG. 4b shows the lightly curved characteristic of the integrator 14. FIGS. 4a and 4b show that the desired requirement is fulfilled and that the control voltage $U_S$ returns to its initial value, after the dynamic process has been regulated.

In summation, therefore, it may be concluded that a change of the regulator output control voltage $U_S$ effects a phase shifting of the sawtooth reference voltage $U_R$ but, at the same time, produces a slight frequency change. The dynamic behavior of the ignition control device is therefore proportionally integral, whereby the difference between the frequency of the power supply or mains and the frequency of the oscillations of the oscillator constitutes a measure of the integral share. Since the frequency of the sawtooth voltage is only shifted by a minimum, the integration time constant is very great. The dynamic behavior is therefore almost proportional and the ignition control device is controllable, as a result.

Furthermore, in an ignition control device which is constructed according to the illustrated embodiment, ignition angle errors which occur will be smaller than ± 0.25°. This error is far below the error occurring in known conventional ignition control devices. The ignition angle symmetry of the ignition control device of the invention is also better than that of an ignition control device of known type.

While the invention has been described by means of a specific example and in a specific embodiment, we do not wish to be limited thereto, for obvious modifications will occur to those skilled in the art without departing from the spirit and scope of the invention.

We claim:

1. An ignition control device for a converter having converter valves and a free oscillating oscillator having an input voltage and an output voltage independent of its input voltage which permits the regulation of the converter valves at variable ignition angles and in a predetermined sequence, said ignition control device comprising controlled quantity means for deriving a controlled quantity in the converter; and phase control means connected to the oscillator and the controlled quantity means for controlling the phase of the output voltage of the oscillator in dependence upon the controlled quantity.

2. An ignition control device as claimed in claim 1, wherein the controlled quantity means derives the load current of the converter as the controlled quantity.

3. An ignition control device as claimed in claim 1, wherein the oscillator provides a reference voltage $U_R$ which increases in proportion to time, and further comprising regulating means connected to the controlled quantity means for providing an output control voltage $U_S$ in dependence upon the controlled quantity $I_i$, threshold means providing a threshold level and connected to the regulating means and the oscillator for comparing the control voltage and the reference voltage $U_R$ and for producing a pulse when the difference between the control voltage $U_S$ and the reference voltage $U_R$ reaches said threshold level, and reset means connected to the threshold means for resetting the reference voltage $U_R$ of the oscillator by a constant magnitude $U'_R$ and for releasing an ignition pulse for a converter valve with the pulse of the threshold means.

4. An ignition control device as claimed in claim 1, further comprising frequency control means connected to the oscillator for controlling the frequency of the oscillator in dependence upon the controlled quantity.

5. An ignition control device as claimed in claim 3, wherein the reference voltage means comprises an integrator and a source of constant direct voltage $U_E$ connected to the integrator.

6. An ignition control device as claimed in claim 3, wherein the reset means comprises a monostable multivibrator releasable when the difference between the output control voltage ($U_S$) and the reference voltage ($U_R$) reaches the threshold level of the threshold means.

7. An ignition control device as claimed in claim 6, further comprising a ring counter connected to the monostable multivibrator, said multivibrator producing a pulse for stepping the ring counter.

8. An ignition control device as claimed in claim 7, further comprising a source of alternating voltage connected to the converter and threshold means connected to the source of alternating voltage for controlling the phase of the oscillator output voltage in a range between two threshold levels in accordance with an ignition angle $\alpha_o = 0°$ and $0° < \alpha_1 < 180°$, the two threshold levels being derived from the alternating voltage of said source of alternating voltage.

9. An ignition control device as claimed in claim 8, wherein the source of alternating voltage provides a three phase alternating voltage each phase providing two pulses shifted in 180° phase opposition relative to the period of alternating voltage, and the threshold means comprises logical circuitry for deriving from the two pulses of each phase and from the ignition pulses of the converter valves, the two threshold levels corresponding to the ignition angles $\alpha_0$ and $\alpha_1$, the threshold level corresponding to the ignition angle $\alpha_o$ being utilized to block the monostable multivibrator independently of the sum of the comparison result and the threshold level corresponding to the ignition angle $\alpha_1$, being utilized to regulate the monostable multivibrator.

10. An ignition control device as claimed in claim 9, further comprising a first plurality of AND gates each having inputs and an output, an OR gate having a plurality of inputs each connected to the output of a corresponding one of the first plurality of AND gates and an output, and an AND gate having one input connected to the output of the OR gate, a second input connected to the output of the threshold means and receiving the comparison result and an output connected to the monostable multivibrator for providing an output signal for controlling the monostable multivibrator, and wherein the ring counter has a plurality of outputs each connected to an input of a corresponding one of the first plurality of AND gates and the threshold means is connected to corresponding inputs of the first plurality of AND gates and supplies the pulses from the source of alternating voltage to inputs of corresponding ones of the first plurality of AND gates.

11. An ignition control device as claimed in claim 10, further comprising a second plurality of AND gates each having inputs and an output, a second OR gate having a plurality of inputs each connected to the output of a corresponding one of the second plurality of AND gates and an output, and another OR gate having one input connected to the output of the second OR gate, a second input connected to the output of the AND gate and receiving the comparison result of the threshold means and an output connected to the monostable multivibrator for providing an output signal for controlling the monostable multivibrator, and wherein each of the outputs of the ring counter is connected to an input of a corresponding one of the second plurality of AND gates and the threshold means is connected to corresponding inputs of the second plurality of AND gates and supplies the pulses from the source of alternating voltage to inputs of corresponding ones of the second plurality of AND gates.

12. An ignition control device as claimed in claim 11, further comprising a second monostable multivibrator having an adjustable pulse duration, an input coupled to the output of the second OR gate and an output connected to the one input of the other OR gate.

13. An ignition control device as claimed in claim 12, wherein the reference voltage means comprises an integrator having a curved characteristic and a source of constant direct voltage $U_E$ connected to the integrator for providing a reference voltage $U_R$ which increases with time, the threshold means compares the output control voltage $U_S$ of the regulating means and the reference voltage, the reset means utilizes the threshold level of the comparison result to reset the reference voltage means by a constant magnitude, and the reference voltage means provides a reset pulse for releasing an ignition pulse for a converter valve.

* * * * *